United States Patent [19]

Baxter et al.

[11] 4,375,056

[45] Feb. 22, 1983

[54] THIN FILM RESISTANCE THERMOMETER DEVICE WITH A PREDETERMINED TEMPERATURE COEFFICENT OF RESISTANCE AND ITS METHOD OF MANUFACTURE

[75] Inventors: Ronald D. Baxter; Paul J. Freud, both of Furlong, Pa.

[73] Assignee: Leeds & Northrup Company, North Wales, Pa.

[21] Appl. No.: 126,068

[22] Filed: Feb. 29, 1980

[51] Int. Cl.³ .............................................. H01C 3/04
[52] U.S. Cl. ..................................... 338/25; 338/195; 338/308
[58] Field of Search ................. 338/25, 195, 307–309; 29/620; 427/125

[56] References Cited

U.S. PATENT DOCUMENTS 3,781,749 12/1973 Iles et al. ................................ 338/25

Primary Examiner—C. L. Albritton
Attorney, Agent, or Firm—William G. Miller, Jr.; Raymond F. MacKay

[57] ABSTRACT

A thin film resistance thermometer is manufactured to have a predetermined temperature coefficient of resistance while minimizing the amount of metal in the film. The process involves the production of a metal film deposit on an insulating substrate such that the film deposited has a bulk coefficient substantially higher than the desired coefficient with the film being deposited to a thickness that produces the desired coefficient.

5 Claims, 3 Drawing Figures

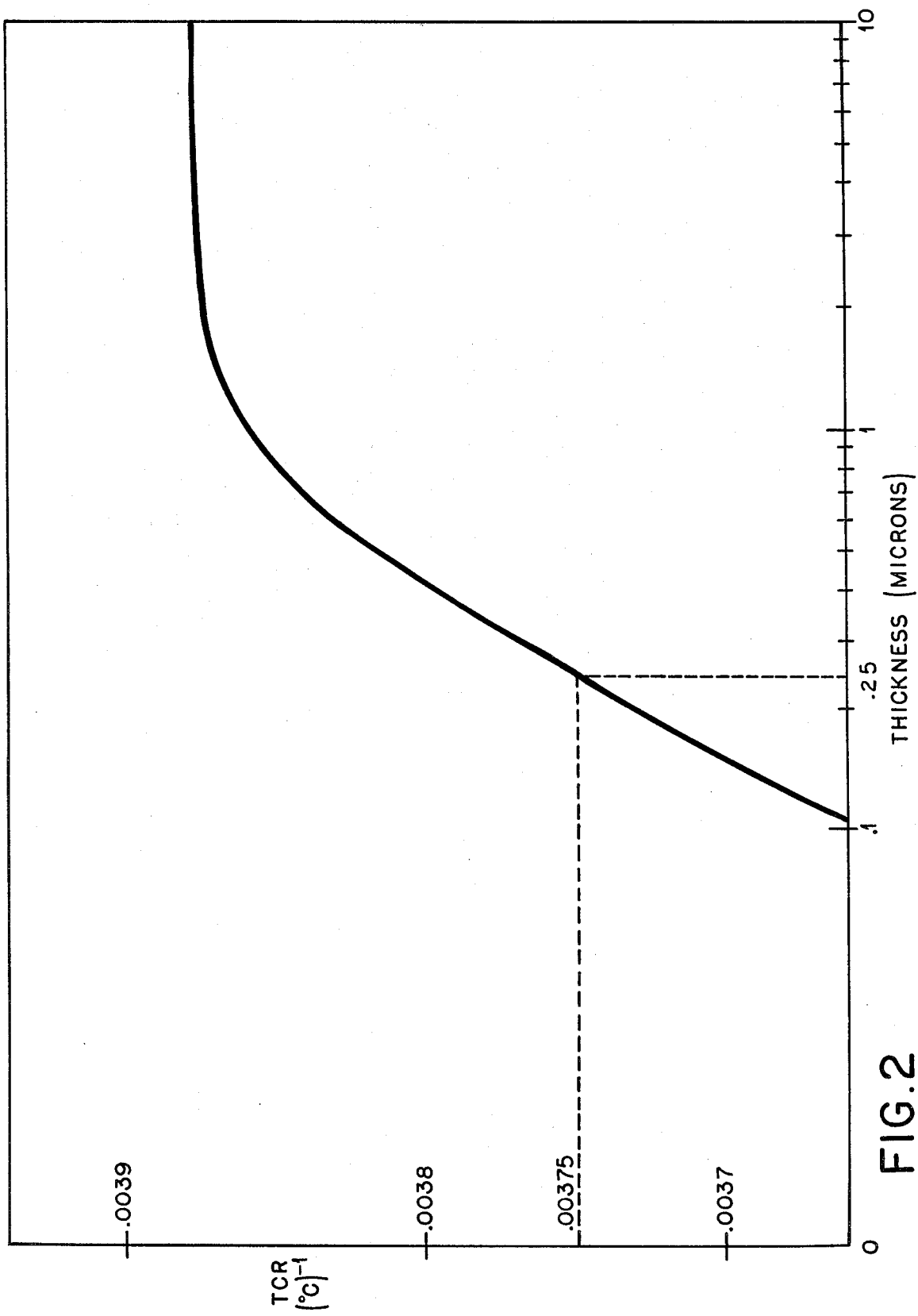

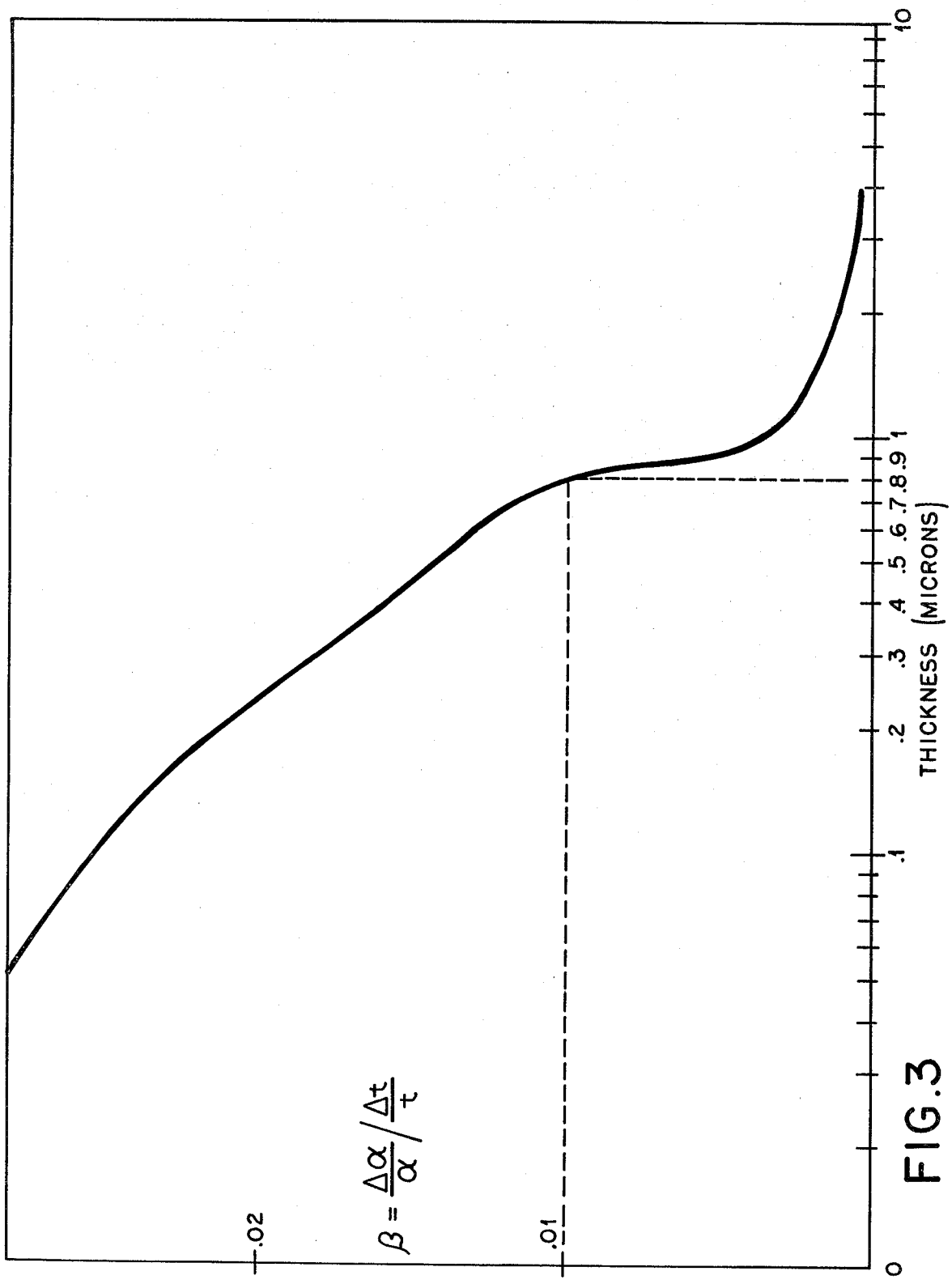

THIN FILM RESISTANCE THERMOMETER DEVICE WITH A PREDETERMINED TEMPERATURE COEFFICENT OF RESISTANCE AND ITS METHOD OF MANUFACTURE

BACKGROUND OF THE INVENTION

This invention relates to thin film resistance thermometer devices (RTD's), and more particularly to thin film RTD chips used to construct the complete resistance thermometer devices where the chips involved are electrically non-conducting support material on which is deposited a thin metallic film.

RTD's are used to measure temperature by relating the device's resistance to the temperature. The resistance increases in an approximately linear manner with slope of α. Alpha is also referred to as the temperature coefficient of resistance (TCR) of the device, and for platinum RTD's it is common practice to define the TCR as the relative resistance change per degree measured over the interval 0° C. to 100° C. Of great value is the fact that platinum RTD's can be made having the same calibration, that is the same ice point resistance and TCR and can thus be used interchangeably. A process for making a thin film RTD must therefore be able to produce RTD's which follow the same calibration interchangeably.

In the past it has been common practice to attempt to establish the TCR of RTD's of thin film construction in a similar manner as was used to control the TCR of wire wound RTD's, namely by the addition of impurities to the metal being used or by the control of the concentration of defects in the film by heat treating films during and after their processing.

It is well known that the higher the concentration of impurities and the higher the concentration of defects in an elemental metal, the lower the value of TCR. Thus, special alloys of platinum or special defect controlling processes have in the past been used to provide the desired TCR. Usually the temperature coefficient of resistances desired has been the industrial standard, namely $0.00385(°C.)^{-1}$, which is slightly below the temperature coefficient of resistance for very thick films or wire of pure, low defect platinum, namely $0.00392(°C.)^{-1}$.

In other prior art methods for obtaining a desired TCR, the film has been deposited by means of RF sputtering on a substrate and including oxygen in the sputtering gas, using bias sputtering and annealing at temperatures greater than 800° C. after deposition as set forth in U.S. Pat. No. 4,103,275 issued to Diehl et al on July 25, 1978. In the Diehl patent control of these variables allows a low enough level of the impurity and defect concentration of the platinum film so that a desired value of TCR is obtained.

In addition the Diehl patent describes how a thin film has been deposited on a substrate having a greater thermal coefficient of expansion than the material of the film. In the Diehl patent there is described the method for effectively increasing the TCR of the film in an attempt to bring it up to that of the industrial standard of $0.00385(°C.)^{-1}$. It will be noted from the examples given in the Diehl patent that the device did not produce the standard TCR but instead produced a higher value. Thus the Diehl structure does not appear to be capable of obtaining a predetermined TCR with a useful degree of accuracy.

The control of the variables which contribute to lowering the TCR is very difficult and is reflected in the fact that very few techniques are available to deposit metal films with a controlled TCR value. It is the object of this invention to provide a thin film platinum resistance thermometer structure with a predetermined TCR and a method for making such a device.

SUMMARY OF THE INVENTION

This invention provides a thin film resistance thermometer element with a predetermined TCR and a method of manufacturing it so as to minimize the amount of metal required for the film and the necessary size of the element. The method comprises the steps of providing an electrically insulating substrate, and depositing on said substrate in a serpentine pattern a film of a metal whose bulk value for TCR is substantially higher than the predetermined TCR, the deposition being of that thickness at which the TCR is of the predetermined value.

BRIEF DESCRIPTION OF THE DRAWINGS

FIG. 2 is a plot of typical data showing the dependence of TCR on thickness and

FIG. 3 is a plot of relative sensitivity of TCR to thickness.

DESCRIPTION OF THE PREFERRED EMBODIMENT

Figure 1:
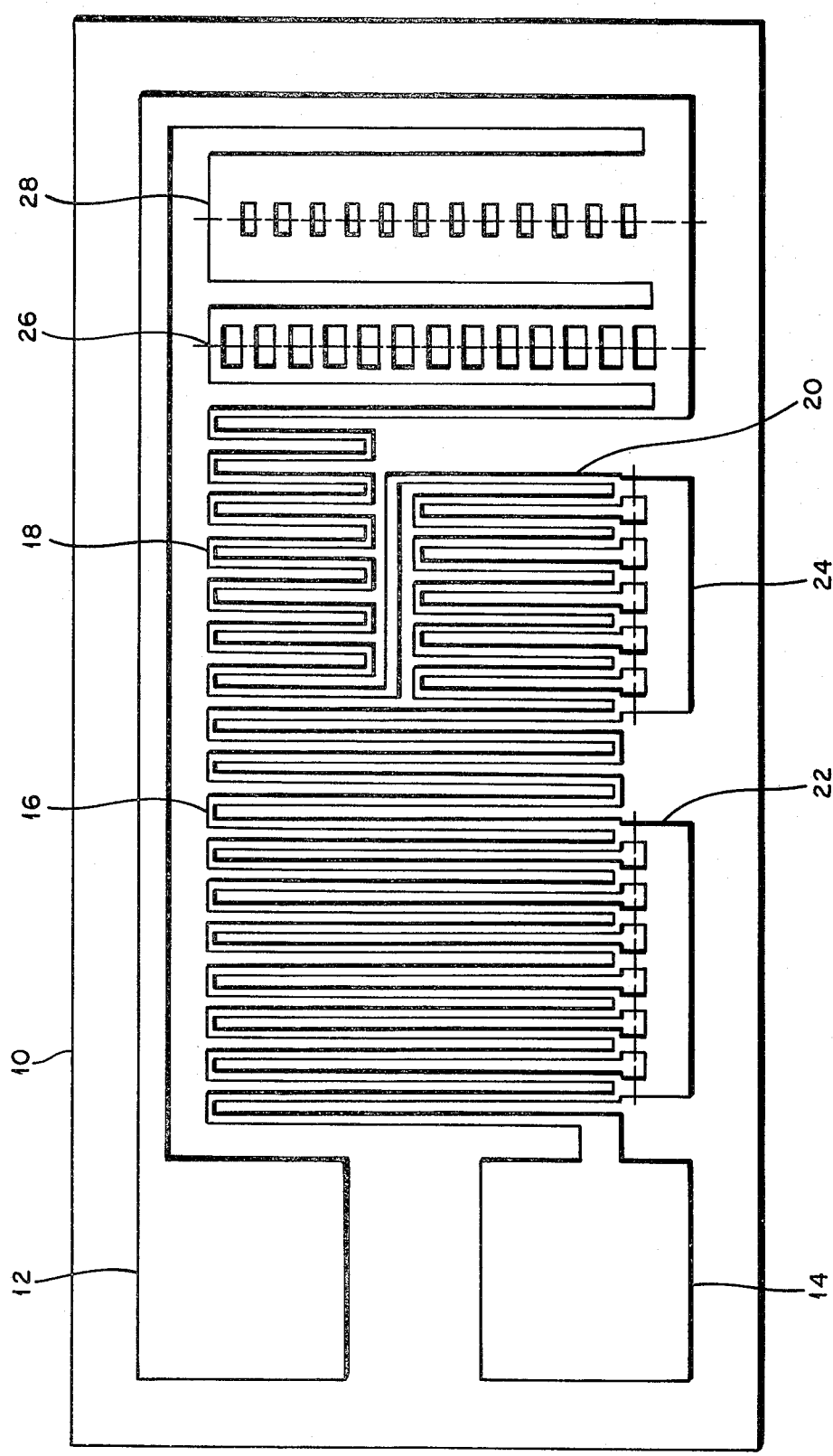
FIG. 1 is a plan view of a typical resistance element of the thin film variety which can be used in this invention.

The object of this invention can be accomplished by depositing on an insulating substrate a thin film whose bulk value of TCR is substantially higher than the desired value and controlling the film thickness as by decreasing the film thickness after the film has been deposited so that the film is sufficiently thin to give the desired temperature coefficient of resistance. Thus, the thickness of the film is reduced to a value well below that thickness at which the temperature coefficient of resistance is not susceptible to much change with the change in thickness or, in other words, where the temperature coefficient of resistance is at what can be called the bulk value for the film deposit. For the purposes of this description the bulk value of the TCR will be considered to be that value which is approached where the thickness of the film deposit is such that very little change in the temperature coefficient of resistance is experienced with changes in the film thickness. The bulk value of the deposited film will depend in large part upon the purity of the film as well as the degree of perfection of that film, all of which is a function of both the purity of the starting material as well as the process used for deposition.

In carrying out this invention it is necessary to first deposit the material of the metal film such as platinum upon the electrically insulating substrate. There are many processes which can be used for the deposition of thin metallic films. These methods include RF sputtering, high vacuum vaporization, chemical vapor deposition of organo-metallic compounds, and other methods well known to those skilled in the art of thin film processing. The substrate may, for example, be $Al_2O_3$, $SiO_2$, or BeO. The deposition should preferably be trimmed to a thickness within the range of 0.05 to 0.8 microns to provide a thickness range which is substantially below that at which the bulk value of the temperature coefficient of resistance of the platinum film is normally obtained. Wherever other metals are to be used comparable adjustment of the thickness range is then required.

In producing the RTD so that it has a desired specific TCR below that of the bulk value for the metal being used, the deposition can be made to a thickness which is known to be greater than that required to provide the desired TCR and then the thickness of the film can be reduced as by ion beam sputter etching or chemical etching down to the desired value. An alternate approach which can be used is to deposit the film to a thickness which is known to be below that required for the desired TCR and then after checking the TCR, increase the thickness in sequential steps as is necessary to reach the thickness giving the desired TCR. Once the time required for deposition to the desired thickness is determined, elements with the same TCR can then be produced simply by timing the deposition process and controlling the deposition rate. Time and deposition rate are the easiest variables to control in thin film processing.

The complete procedures which can be used for producing resistance thermometer elements is, as mentioned before, well known to those familiar with the thin film techniques used in microelectronics. Thus, the resistance thermometer element may be formed, for example, by using an electrically insulating substrate. The thin film which may, for example, be platinum, may then be sputtered, vacuum vaporized, or deposited by chemical vapor deposition on to the substrate to build the thicknesses of the film as mentioned above. For the production of the serpentine pattern for the film the deposited film is coated, for example, with a photosensitive lacquer and the desired serpentine pattern is produced by selective exposure to light in accordance with the desired pattern design and subsequent development to remove that portion of the photosensitive lacquer covering areas of the film that are to be removed to provide the pattern. The final desired conductor path can then be produced by ion etching or by other processes of removing the platinum which remains unprotected by the photosensitive lacquer. An alternate method would be to cut the pattern directly in the film by a laser to the desired geometry.

After the thickness of the film deposited in the serpentine pattern is adjusted as required in accordance with this invention as by decreasing the thickness to obtain the desired TCR, certain portions of the pattern can be opened to change the effective pattern by use of laser beam cutting or ultrasonic probe cutting or other film cutting techniques to change the pattern by removing links in certain areas of the pattern, or by laser cutting the pattern directly, thus adjusting the ice point resistance.

The value of desired TCR must be substantially below the bulk value so that the TCR is a sensitive function of thickness.

In FIG. 1 there is shown a plan view of one form which the thin film resistance thermometer element can take. The electrically insulating substrate 10 has deposited on it a thin film of a metal such as platinum. The deposited metal includes contact pads 12 and 14 to which the external circuit can be connected. The conductive path between the contact pads is made up of sections which have different functions. The serpentine pattern 16 is of full width while the sections 18 and 20 are of half width. As is evident from FIG. 1, the full width section 16 has shorting links 22 and the half width section 20 has shorting links 24. In addition to the shorting links which can be cut to increase the total resistance at a particular temperature, such as 0° C., sections 26 and 28 provide successively decreasing increments of resistance which can be added by appropriate cutting of the film. The cutting of the shorting links can thus be made along the dashed lines to provide the necessary trimming of the resistance to provide the desired ice point resistance once the thickness of the film has been established at the proper value to obtain the desired TCR.

FIG. 2 is a plot of data taken from a typical platinum thin film RTD with a bulk TCR of $0.00388 (°C.)^{-1}$. As the thickness decreases from 4 microns the TCR changes very little until the thickness is less than 1 micron. Below 1 micron the TCR decreases more and more rapidly with thickness.

A measure of the sensitivity of TCR to thickness can be expressed as the ratio of the relative change in TCR to relative change in thickness.

$$\beta = \frac{\Delta \alpha}{\alpha} / \frac{\Delta t}{t}$$

α=TCR
t=thickness

FIG. 3 is a plot of the TCR sensitivity versus thickness. The film resistance at the ice point is inversely proportional to film thickness so that the relative change in thickness is minus the relative change in resistance. When the film is too thick the TCR changes very little with film thickness while the ice point resistance for a given pattern will change in inverse proportion with thickness. For instance at a thickness of 4 microns in FIG. 3, a decrease of film thickness to 2 microns will change the TCR by less than 0.1%, an amount which is less than a typical tolerance on an industrial RTD specification. For the same thickness change the resistance will increase by 50%. On the other hand, at 0.2 microns a decrease of film thickness to 0.1 microns will decrease the TCR by 2.2% and increase the resistance by 50%. We have, therefore, discovered a sensitivity level that makes it practical to trim both TCR by thickness adjustment and ice point resistance by the pattern changes as described above. In practice it is desirable to trim the RTD ice point as small an amount as possible so that the trimming pattern is simple and the device takes up a minimum of chip area. Therefore, it is desirable to operate in a thickness range where the TCR is a reasonably sensitive function of thickness so that TCR trimming by thickness adjustment will not cause too great a resistance change.

At the low end of the thickness range the film will eventually meet a limit where the film is no longer continuous, but is instead made up of islands of the metal. These islands are not connected and are the result of the nucleation process when the film is initially deposited. As atoms of the metal first are deposited they start agglomerating at nucleation points on the substrate. These agglomeration points grow into islands of the metal and finally the islands grow together to form a continuous film. In following the electrical behavior of the film as it grows, one observes first open circuit until the islands get close together. At this point electrical conductivity arises from electrons overcoming the barrier between islands. The conduction is characterized by a negative TCR. Decreasing the island size further results in a combination of barrier limited conduction and bulk conduction. A thickness region will be experienced where the TCR will be zero as the result of the offsetting positive TCR of the bulk metal and the negative TCR of the barriers. This region is not of practical importance for RTD's since the TCR is low and difficult to control. Only at a thickness which is substantially thicker than the point where the TCR goes through zero can practical RTD's be made in accordance with this invention.

For platinum, using a thin film process which results in a bulk TCR of $0.00385(°C.)^{-1}$, the useful thickness falls in the approximate range of 0.05 to 0.8 microns. In this thickness range the sensitivity of TCR to thickness will be greater than 1% as is shown in FIG. 3. Below 0.05 microns the film is too thin to be practically handled since substrate roughness and film continuity become a practical problem.

As an example for a film with a bulk TCR of $0.00388(°C.)^{-1}$, as in FIG. 2, the TCR will be reduced to $0.00375(°C.)^{-1}$ at a thickness of 0.25 microns and will have a sensitivity to thickness of approximately 1% per 50% change in thickness. The 50% thickness change will change the resistance by 50%, an amount which can be handled effectively by the resistance trimming techniques. To complete the fabrication of the resistance thermometer, the chip can be mounted in whatever protective tube or device is necessary for the application for which the device is to be used.

What is claimed is:

1. A resistance thermometer element comprising:
an electrically insulating substrate; and
a thin platinum film deposited on said substrate in a pattern to produce a desired ice point resistance with the film being of a thickness between 0.05 and 0.8 microns purity and perfection such that its bulk TCR is substantially above the desired TCR.

2. A resistance thermometer element comprising:
an electrically insulating substrate; and
a thin platinum film deposited on said substrate in a pattern to produce a desired ice point resistance with the film thickness as required to produce a desired TCR and in a range such that the ratio of relative change of TCR to relative change in film thickness is greater than 0.01.

3. A resistance thermometer element comprising:
an electrically insulating substrate; and
a thin platinum film deposited on said substrate in a pattern to produce a desired ice point resistance with a film thickness between 0.05 and 0.8 microns as required to produce a desired TCR and maintain the thickness in a range where the ratio of relative change of TCR to relative change in film thickness is greater than 0.01.

4. A resistance thermometer element comprising:
an electrically insulating substrate; and
a thin electrically conductive metal film deposited on said substrate in a pattern to produce a desired ice point resistance with the film thickness being that required to produce a desired TCR and in a range such that the ratio of relative change of TCR to relative change in film thickness is greater than 0.01.

5. A resistance thermometer element comprising:
an electrically insulating substrate; and
a thin platinum film deposited on said substrate in a pattern to produce a desired ice point resistance with the film thickness between 0.05 and 0.8 microns as required to produce a desired TCR, and be below the thickness at which the metal has its bulk value and substantially above the thickness at which nucleation effects predominate in determining those characteristics of the film relating to its conductivity and its TCR.

* * * * *